S. GORNEAU.
AUTOMOBILE SIGNAL.
APPLICATION FILED AUG. 4, 1920. RENEWED SEPT. 28, 1921.
1,431,889. Patented Oct. 10, 1922.
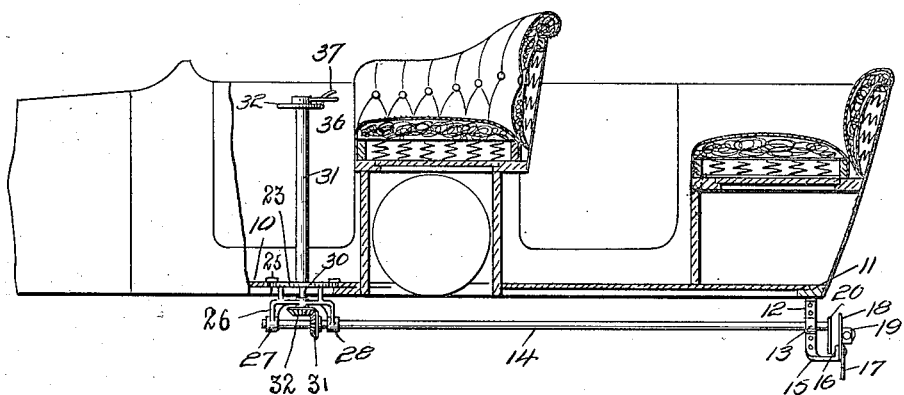
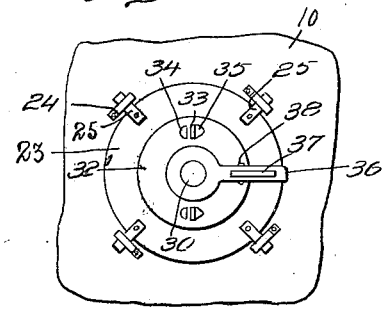
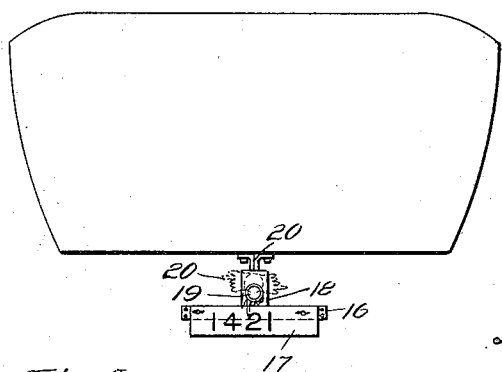
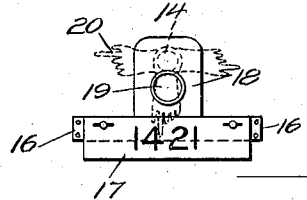
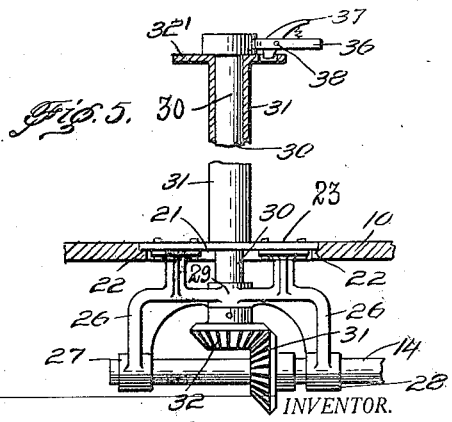
INVENTOR.
S. Gorneau.
BY
Geo. P. Kimmel
ATTORNEY.

Patented Oct. 10, 1922.

1,431,889

UNITED STATES PATENT OFFICE.

SAMUEL GORNEAU, OF SAN ANTONIO, TEXAS.

AUTOMOBILE SIGNAL.

Application filed August 4, 1920, Serial No. 401,123. Renewed September 28, 1921. Serial No. 503,961.

*To all whom it may concern:*

Be it known that I, SAMUEL GORNEAU, a subject of the King of Great Britain, residing at San Antonio, in the county of Bexar and State of Texas, have invented certain new and useful Improvements in an Automobile Signal, of which the following is a specification.

This invention relates to visual traffic signals for vehicles, more particularly to auto-driven vehicles, and has for one of its objects to simplify the construction and increase the efficiency and utility of devices of this character.

With these and other objects in view, the invention consists in certain novel features of construction as hereinafter shown and described and then specifically pointed out in the claim, and in the drawings illustrative of the preferred embodiment of the invention.

In the accompanying drawing:

Figure 1 is a side elevation of the improved device installed on a conventional auto-driven vehicle, and partly in section.

Fig. 2 is a rear elevation of the body of the vehicle with the improved device applied.

Fig. 3 is a plan view of the standard showing the construction of the controlling lever and of the support for the standard.

Fig. 4 is an enlarged detail of the semaphore portion of the device.

Fig. 5 is an enlarged sectional elevation of the transmitting mechanism.

The improved device may be installed on many forms of vehicle, but is designed more particularly for use in connection with auto-driven vehicles, and for the purpose of illustration is shown arranged in connection with the body and chassis portions of a conventional automobile, in which the floor of the chauffeur's compartment is represented at 10 and a portion of the chassis at 11.

Depending from the portion 11 is a bracket or hanger 12 having a bearing 13 for a shaft 14.

The hanger 12 is formed with an extension 15 at the lower end, and provided with an upturned terminal 16 to which the number plate 17 of the vehicle is attached. Likewise attached to the upstanding portion 16 is a blind or covering device 18 to which a light imparting medium indicated at 19, is attached.

Connected to the shaft 14 between the bracket 12 and the blind 18 is a semaphore arm 20, preferably with its free end in the form of a hand with the index finger extended, as shown.

When the semaphore arm is in vertical or downward position as indicated in Fig. 1, and by dotted lines in Fig. 4, it will be concealed from observation by a person approaching in the line of travel of the vehicle, and is visible only when the shaft is rotated to move the arm to the right or left.

Formed in the floor 10 is a relatively large opening 21 having an inwardly directed annular flange 22, and disposed within the opening and seated on the flange is a plate 23. Attached to the floor 10 are a plurality of keepers 24, and pivoted to the plate 23 are a corresponding number of buttons 25 to engage beneath the keepers, and thus lock the plate in position within the opening.

Attached to the lower face of the plate 23 is a hanger 26, having bearings 27 and 28 in longitudinal alinement and in parallel relation to the plate 23, and providing a support for the shaft 14.

Formed in the hanger 26 is another bearing 29 in which a vertical shaft 30 is mounted for rotation and extends upwardly through the plate 23.

Miter pinions 31 and 32 are connected respectively to the shafts 14 and 30 and transmit the motion of the shaft 30 to the shaft 14.

Rising from the plate 23 is a sleeve or column 31 for supporting the shaft 30. Attached to or formed upon the upper end of the column 31 is a disk or plate 32' having sockets 33 at diametrically opposite points and a stop 34 adjacent each socket. Each socket is formed with one side inclined, as shown at 35. Attached to the upper end of the shaft 30 is an operating lever or arm 36 having a longitudinally directed slot in which a locking latch member 37 is pivoted at 38.

The longer outer part of the latch constitutes a finger grip while the shorter lower end is in position to enter the sockets 33 when the arm is moved to the right or left, the inclined sides of the sockets enabling the "toe" of the catch to automatically enter the sockets.

By this means, it will be obvious, that when the arm 36 is moved, the semaphore 20 will be correspondingly moved, the direction of motion being determined by the direction of motion of the lever arm.

When the lever arm 36 is in its neutral or central position, the semaphore arm 20 will likewise be in neutral or central position and concealed behind the blind 18.

The chauffeur is thus able to turn the semaphore arm in the proper direction to indicate the direction in which the vehicle is to be moved by simply manipulating the lever arm 36.

The improved device is simple in construction, can be inexpensively manufactured and applied and operates effectually for the purposes described.

The preferred embodiment of the invention is disclosed in the drawings and set forth in the specification, but it will be understood that any modifications within the scope of the claim may be made in the construction without departing from the principle of the invention or sacrificing any of its advantages.

I claim:

In a direction indicator, a support having an opening surrounded by a sustaining flange, a plate engaging in said opening and bearing on said flange, means for detachably securing said plate in said opening and on said flange, a hanger suspended from said plate, a shaft carried by said hanger, a semaphore arm carried by said shaft, and means operative above said support for rotating said shaft to dispose said semaphore in active position.

In testmony whereof, I affix my signature hereto.

SAMUEL GORNEAU.